3,142,657
Patented July 28, 1964

3,142,657

ELASTIC REACTION PRODUCT OF A POLYEPOXIDE, A GLYCOL, AND AN ACID ANHYDRIDE

Willy Fisch, Binningen, Switzerland, assignor to Ciba Limited, Basel, Switzerland, a Swiss firm No Drawing. Filed Oct. 18, 1957, Ser. No. 690,913
Claims priority, application Switzerland Aug. 12, 1949
13 Claims. (Cl. 260—45.4)

It is known that compounds which contain at least two epoxide groups per mol can be converted into infusible artificial resins by means of cross-linking agents, such for example as polycarboxylic anhydrides, hardening taking place practically without the formation of volatile by-products and with only very slight shrinkage. Owing to their mechanical properties and chemical resistance such products are of considerable interest as cast products, lacquers or adhesives, especially for metals. As cross-linking agents there have been used only compounds in which the distance between the groups capable of reacting with epoxide groups is small.

However, in addition to their good properties for certain purposes the products so obtained have the disadvantage that they are not sufficiently extensible and elastic.

The present invention is based on the observation that valuable artificial masses can be made by mixing a compound containing more than one epoxide group per mol with a cross-linking agent, and if desired, a catalyst, provided that certain requirements are observed. These requirements are that the linking agent used must be a compound containing at least two groups capable of reacting with epoxide groups, and at least two of these reactive groups must be separated from one another by a chain of at least 10, preferably at least 14, and advantageously at least 24, members. The artificial masses so obtained can be converted by heat, if desired, with the aid of catalysts, into useful artificial products.

Thus, depending on the nature of the artificial mass and on the manner in which it is treated, there can be obtained as an intermediate stage fusible and inelastic artificial products, which can be converted by further treatment at a later stage into fusible and elastic products, and especially into infusible final products of surprising elasticity. Obviously, such final products can be obtained in one operation from the artificial masses. The degree of elasticity can be varied within wide limits. It depends on the quantity of the cross-linking agent used, on the number and nature of the members between the active groups in the cross-linking agent and also on the distance apart of the epoxide groups in the compound containing such groups. The elasticity can also be strongly influenced by using, in addition to a cross-linking agent in which a chain of at least 10 members separates the reactive groups, one in which those groups are separated by a chain having less than 10 members. In general, in this manner the modulus of elasticity is increased and the length to which this material can be drawn out before breaking reduced.

As groups, hereinafter also referred to as active groups, capable of reacting with epoxide groups, there may be used principally groups containing active hydrogen, for example, radicals of acid or alkaline action, such as carboxyl, or amino or amide or imino or imide groups. The acid groups may be present in the form of anhydrides or in another form which is easily convertible into the free acid. However, there may also be used aliphatic hydroxyl-groups generally requiring more extreme reaction conditions such as a higher temperature or the use of catalysts.

The active groups of the cross-linking agent may be bound together by a very wide variety of different kinds of members, such as

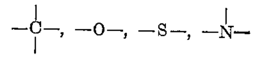

or aliphatic, aromatic or heterocyclic rings etc. Rigid rings such, for example, as benzene rings, are reckoned as one member.

This application is particularly concerned with the employment of polyalkylene glycols containing two terminal hydroxyl groups which are separated from one another by a chain of at least 14 members.

More specifically, this application concerns a composition of matter capable of forming an elastic infusible reaction product, which consists essentially of a hardenable 1,2-epoxide compound, containing more than one epoxide group per mol and, as a cross-linking agent, a mixture of a polyalkylene glycol containing two terminal hydroxyl groups, which are separated from one another by a chain of at least 14 members, and of a polycarboxylic acid anhydride, said elastic product containing said chain of at least 14 members intact.

Furthermore, this application is more specifically concerned with a process for the manufacture of an elastic artificial product which consists essentially of reacting, with heat, a compound containing more than one 1,2-epoxide group per mol with, as cross-linking agent, a polyalkylene glycol containing two terminal hydroxyl groups, which are separated from one another by a chain of at least 14 members, and the reaction with heat being carried out in the presence of a polycarboxylic acid anhydride to a point where the reaction mass becomes infusible, whereby an elastic product is obtained, said elastic product containing said chain of at least 14 members intact.

Among the polyalkylene glycols referred to above, there may be mentioned the polyethylene glycols and the polypropylene glycols, for example those having average molecular weights of 200, 400 and 700.

Among the polycarboxylic anhydrides, there may be mentioned, for example, phthalic anhydride, tetrachlorophthalic anhydride, hexachloro-endomethylene tetrahydrophthalic anhydride, succinic anhydride, anhydrides of polybasic aromatic carboxylic acids, certain addition products of maleic anhydride with diene components; maleic anhydride or hydrogenated phthalic anhydrides such as tetrahydro- or hexahydro-phthalic anhydrides. There may be used mixtures of different anhydrides. These mixtures may contain any desired ratios of the components. There may be used, for example, mixtures which are so prepared that the melting point of the mixture is either lower than the melting point of the second highest melting component or lower than the melting point of the lowest melting component. Finally, there may be used, for example, a eutectic mixture.

As compounds containing more than one epoxide group per mol there are to be understood both chemical unitary compounds and also mixtures of compounds containing epoxide groups. There may be mentioned, for example, butadiene dioxide or epoxy compounds which are obtained in known manner by reacting poly-carboxylic acids, such as aliphatic dicarboxylic acids or advantageously aromatic dicarboxylic acids or polyhydroxyl compounds, such as glycols, or mono-nuclear or poly-nuclear polyphenols advantageously diphenols, with epichlorhydrin or dichlorhydrin in the presence of an aqueous alkali, whereby, depending on the molecular ratio of the components used, mixtures of different polyesters or polyethers having chains of different lengths and epoxide groups predominantly in end positions and, if desired, intermediately placed hydroxyl groups are obtained. For example, the polyethers referred to above have the following constitution:

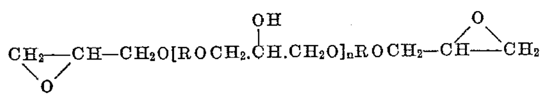

in which the atomic grouping ORO may represent, for example, the radical of a so-called diphenol, that is to say, for example, a compound of the type of 4:4′-dihydroxydiphenyl-dimethylmethane, or resorcinol.

Aliphatic alcohols and epichlorhydrin can also be converted into chlorhydrin ethers with the aid of condensing agents such as boron trifluoride, which chlorhydrin ethers change into compounds containing epoxide groups by the elimination of hydrogen chloride by means of an agent of alkaline reaction. Furthermore, it is possible to obtain substances containing epoxide groups by treating compounds containing olefinic double bonds with oxidizing agents, for example perbenzoic acid or with hypochlorite.

It is of advantage to use starting materials containing epoxide groups in which there is a certain distance between at least two of the epoxide groups. The epoxide groups may be connected to one another in various ways. Generally speaking, it can be said that when the active groups of the cross-linking agent are relatively far apart the distance between the epoxide groups may be smaller.

In order to produce artificial masses, which can be converted by heat and if desired with the aid of catalyst into hardened elastic artificial products, the compounds containing epoxide groups are mixed with the cross-linking agents and if desired, with catalysts. If the starting materials are liquid, the mixture may be produced at room temperature, and if one or both of them are solid, the mixing is best conducted with the aid of heat in the form of a liquid melt. The use of high temperatures may also be of advantage when the starting materials are not easily compatible with one another. The mixture is then treated at a raised temperature until a clear melt is obtained.

Mixing may also be carried out in the presence of solvents, and in this manner, depending on the choice of the solvents, lacquers can be obtained ready for use, which yield elastic coatings.

However, it is also possible to obtain artificial masses which withstand storage and are liquid or at least thickly liquid at room temperature, and which can be used without any solvent at ordinary temperature, for example, for coating or casting, and which after application can be converted, for example, by heat treatment into the hardened and elastic state.

In this case the aforesaid products constitute solvent-free lacquers and may also be used for adhesively uniting a very wide variety of materials, especially metals, as such or on other substrata.

The new products represent a considerable advance, for example, in the art of making cast products. Hitherto it has indeed been possible to produce large hardened bubble-free cast products with the aid of compounds containing epoxide groups. However, it has always been difficult to enclose large articles such as metal parts by casting resins, such as is frequently required, for example, in the case of electrical apparatus, because strains subsequently occur due to the difference between the coefficients of thermal expansion of resin and metal. These difficulties are overcome by means of the new elastic products even in the hardened condition, since an enclosure covering a large metal core and composed of the new artificial product exhibits no fissures even after a long time.

The relative proportions by weight of the cross-linking agent and the compound containing epoxide groups may vary within very wide limits. Advantageously the cross-linking of the compound containing epoxide groups is brought about with a proportion of the cross-linking agent such as contains in the active groups a number of active hydrogen atoms approximately corresponding to the number of epoxide groups present.

As catalysts there may be used basic and acid catalysts such as are in themselves known. Especially suitable are nitrogenous substances such as amides or amines, for example, triethylene tetramine and also, for example, sodium hydroxide or sulfuric acid. There may also be used substances of the type of Friedel-Crafts catalysts, for example, boron trifluoride. There are also cross-linking agents which act sitmultaneonusly as catalysts such, for example, as triethylene tetramine mentioned above and polyesters containing tertiary nitrogen atoms, for example, a polyester obtained from adipic acid and ethyldiethanolamine, or from sebacic acid and triethanolamine.

The hardenable artificial masses or their components may be mixed at any stage prior to hardening with filling materials, softening agents, coloring substances, etc. The invention also includes the possibility that a part of the cross-linking agent, especially when it is used in large quantities, does not react completely an therefore acts as a softening agent.

The terms "hardenable" and "harden" are used herein not in a mechanical sense but with reference to the chemical properties or reactions. Those terms denote the capacity for conversion and the actual conversion, respectively, from a soluble and fusible condition into an insoluble and infusible condition. Accordingly, chemical hardening may lead to products which are mechanically very soft.

The following examples illustrate the invention, the parts being by weight:

*Example 1*

In order to prepare a product containing epoxide groups 228 parts of dihydroxy-diphenyl-dimethyl methane (1 mol) are reacted with 463 parts of epichlorohydrin (5 mols) and an aqueous solution of caustic soda, and the product is washed and dried. A still liquid product of relatively low molecular weight, which contains 5.1 epoxide equivalents per kilogram, is obtained. Separate portions of a mixture of 59 parts (1 mol) of the above epoxy resin and 46 parts (2 mols) of hexahydrophthalic acid anhydride are mixed with 43 (0.7 mol), 54 (0.9 mol) and 65 parts (1.1 mols) of polypropyleneglycol of an average molecular weight of 400 corresponding to a chain length of about 20. The mixtures are heated for 16 hours at a temperature of 160° C. The resulting products give hard-elastic or soft-elastic rubber-like products with a Shore hardness (Durometer A, ASTM D676–49T) of 84, 43 and 20, respectively.

The ratios between the components in the combinations are not restricted to those indicated above. For instance, similar products are obtained if 47 parts of 71 parts or the above epoxy resin are mixed with 46 parts of hexahydrophthalic acid anhydride and 54 parts of polypropylene glycol having an average molecular weight of 400, or if 59 parts of the above epoxy resin are combined with 37 or 55 parts of hexahydrophthalic acid anhydride and 54 parts of the above polypropylene glycol.

By using 39 parts (1 mol) of the above epoxy resin, 30 parts (2 mols) phthalic acid anhydride and 34 (0.5 mol), 51 (0.7 mol) or 68 parts (0.9 mol) of polypropyleneglycol of an average molecular weight of 750 corresponding to a chain length of about 38, products with a Shore hardness of 84, 28 and 3, respectively, are obtained.

*Example 2*

When 59 parts of the liquid epoxide resin described in Example 1 are combined with 46 parts of hexahydrophthalic acid anhydride and 27, 38 or 54 parts of polyethylene glycol having an average molecular weight of 200 (Polyethylene Glycol 200 of Carbide and Carbon Chemicals Co.), a mixture is obtained which can be cast at room temperature and which after being hardened in molds for 16 hours at 160° C. give clear, rubber-like castings having a Shore hardness of 98, 87 or 30, respectively. When 76 parts of Polyethylene Glycol 200 are used, the mixture is still viscous after a hardening period of 16 hours at 160° C.

*Example 3*

50 parts of the liquid epoxide resin described in Example 1 are mixed with 50 parts of a liquid hardener consisting of a mixture of 78 parts of hexahydrophthalic acid anhydride, 13 parts of tetrahydrophthalic acid anhydride, 9 parts of phthalic acid anhydride, and 16 parts of cresyl glycide, and to the resulting mixture are added 25, 35 or 50 parts of polyethylene glycol of an average molecular weight of 200. Mixtures are obtained which can be cast at room temperature and which on being hardened for 16 hours at 160° C. give clear hard rubber-like to soft, raw rubber-like moldings of Shore hardness 98, 78 or 17, respectively. When 65 parts of Polyethylene Glycol 200 are used the mixture does not harden in 16 hours at 160° C.

*Example 4*

59 parts of the epoxide resin described in Example 1 are mixed with 46 parts of hexahydrophthalic acid anhydride and 27, 38 or 54 parts of polyethylene glycol having an average molecular weight of 400 (Polyethylene Glycol 400 of Carbide and Carbon Chemicals Co.) and hardened in molds for 16 hours at 160° C. Castings having properties like hard rubber or soft rubber and a Shore hardness of 99, 81 or 16 are obtained. With 76 parts of Polyethylene Glycol 400 no hardening takes place.

*Example 5*

Molding resin mixtures consisting of 50 parts of the epoxide resin described in Example 1, 50 parts of the liquid hardener mixture described in Example 2, and 25, 35 or 50 parts of polyethylene glycol having an average molecular weight of 400, when hardened for 16 hours at 160° C., give rubber-like products having a Shore hardness of 99, 65 or 8, respectively. When 65 parts of polyethylene glycol are used the mixture is still viscous after 16 hours at 160° C.

*Example 6*

50 parts of a solid epoxy resin which contains 2.2 epoxide equivalents per kg. and which is obtained by reacting dihydroxy-diphenyl-dimethyl methane with epichlorhydrin in the presence of alkali are combined with 15 parts of phthalic acid anhydride and 20, 25 or 30 parts of polypropylene glycol of the average molecular weight of 425. The mixtures are heated for 16 hours at a temperature of 160° C. The resulting products are elastic and have a Shore hardness of 98, 82 and 68 respectively.

*Example 7*

9 parts of a solid epoxy compound, obtained by reacting hydroquinone with epichlorhydrin in the presence of alkali, which epoxy compound contains 7.9 epoxide equivalents per kg., are melted together with 9 parts of phthalic acid anhydride and 9 or 15 parts of polypropylene glycol of the average molecular weight of 425. The mixtures are heated for 16 hours at 160° C. Elastomeric products with a Shore hardness of 87 or 34, respectively, are obtained.

*Example 8*

5 parts of butadiene dioxide and 15 parts of hexahydrophthalic acid anhydride are melted together with 5 parts or 10 parts of polyethylene glycol of the average molecular weight of 200. The mixtures are heated for 16 hours at 120° C. and subsequently for 22 hours at 160° C. Elastic products with a Shore hardness of 45 or 20, respectively, are obtained.

*Example 9*

10 parts of a liquid epoxy resin, obtained by reacting ethylene glycol with epichlorhydrin in the presence of alkali, containing 5.0 epoxide equivalents per kg., are mixed with 5 parts of succinic acid anhydride and 1.25 or 2.5 parts of polyethylene glycol of the average molecular weight of 400. After hardening for 16 hours at 160° C. soft rubber-like products with a Shore hardness of 79 and 69, respectively, are obtained.

This application is a continuation-in-part of application Ser. No. 518,366, filed June 27, 1955, now Patent No. 2,830,031; application Ser. No. 518,366 is in turn a continuation-in-part of application Ser. No. 177,774, filed August 4, 1950, now Patent No. 2,712,535.

What I claim is:

1. A process for the manufacture of an elastic artificial product which consists essentially of reacting, with heat, a compound containing more than one 1,2-epoxide group per mol with, as cross-linking agent, a polypropyleneglycol having an average molecular weight of about 200 to about 750 containing two terminal hydroxyl groups, which are separated from one another by a chain of at least 14 members selected from the class consisting of

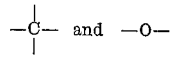

and the reaction with heat being carried out in the presence of a dicarboxylic acid anhydride to a point where the reaction mass becomes infusible, whereby an elastic product is obtained, said elastic product containing said chain of at least 14 members intact.

2. A process for the manufacture of an elastic artificial product which consists essentially of reacting, with heat, a compound containing more than one 1,2-epoxide group per mol with, as cross-linking agent, a polyalkylene glycol of an average molecular weight of about 200 to about 750 containing two terminal hydroxyl groups, which are separated from one another by a chain of at least 14 members selected from the class consisting of

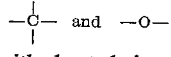

and the reaction with heat being carried out in the presence of a dicarboxylic acid anhydride to a point where the reaction mass becomes infusible, whereby an elastic product is obtained, said elastic product containing said chain of at least 14 members intact.

3. A process for the manufacture of an elastic artificial product which consists essentially of reacting, with heat, a compound containing more than one 1,2-epoxide group per mol and which compound is obtained by reacting a polyphenol with an epichlorhydrin in the presence of alkali with, as cross-linking agent, a polyalkyleneglycol having an average molecular weight of about 200 to about 750 containing two terminal hydroxyl groups, which are separated from one another by a chain of at least 14 members selected from the class consisting of

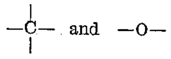

and the reaction with heat being carried out in the presence of a dicarboxylic acid anhydride to a point where the reaction mass becomes infusible, whereby an elastic product is obtained, said elastic product containing said chain of at least 14 members intact.

4. A process for the manufacture of an elastic artificial product which consists essentially of reacting, with heat, a compound containing more than one 1,2-epoxide group per mol and which compound is obtained by reacting dihydroxy-diphenyl-dimethyl methane with epichlorhydrin in the presence of alkali with, as cross-linking agent, a polyalkyleneglycol having an average molecular weight of about 200 to about 750 containing two terminal hydroxyl groups, which are separated from one another by a chain of at least 14 members selected from the class consisting of

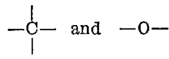

and the reaction with heat being carried out in the presence of a dicarboxylic acid anhydride to a point where the reaction mass becomes infusible, whereby an elastic product is obtained, said elastic product containing said chain of at least 14 members intact.

5. A process for the manufacture of an elastic artificial product which consists essentially of reacting, with heat, a compound containing more than one 1,2-epoxide group per mol and which compound is obtained by reacting an aromatic polycarboxylic acid with an epichlorhydrin in the presence of alkali with, as cross-linking agent, a polyalkyleneglycol having an average molecular weight of about 200 to about 750 containing two terminal hydroxyl groups, which are separated from one another by a chain of at least 14 members selected from the class consisting of

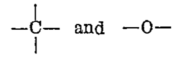

and the reaction with heat being carried out in the presence of a dicarboxylic acid anhydride to a point where the reaction mass becomes infusible, whereby an elastic product is obtained, said elastic product containing said chain of at least 14 members intact.

6. A process for the manufacture of an elastic artificial product which consists essentially of reacting, with heat, a compound containing more than one 1,2-epoxide group per mol with, as cross-linking agent, a polyalkyleneglycol having an average molecular weight of about 200 to about 750 containing two terminal hydroxyl groups, which are separated from one another by a chain of at least 14 members selected from the class consisting of

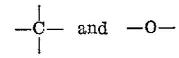

and the reaction with heat being carried out in the presence of an aromatic dicarboxylic acid anhydride to a point where the reaction mass becomes infusible, whereby an elastic product is obtained, said elastic product containing said chain of at least 14 members intact.

7. A process for the manufacture of an elastic artificial product which consists essentially of reacting, with heat, a compound containing more than one 1,2-epoxide group per mol with, as cross-linking agent, a polyalkyleneglycol having an average molecular weight of about 200 to about 750 containing two terminal hydroxyl groups, which are separated from one another by a chain of at least 14 members selected from the class consisting of

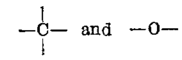

and the reaction with heat being carried out in the presence of a hydroaromatic dicarboxylic acid anhydride to a point where the reaction mass becomes infusible, whereby an elastic product is obtained, said elastic product containing said chain of at least 14 members intact.

8. An elastic infusible product, which consists essentially of the reaction product of a compound containing more than one 1,2-epoxide group per mol with, as cross-linking agent, a mixture of a polyalkylene glycol having an average molecular weight of about 200 to about 750 containing two terminal hydroxyl groups, which are separated from one another by a chain of at least 14 members selected from the class consisting of

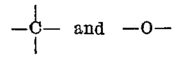

and of a dicarboxylic acid anhydride, said elastic product containing said chain of at least 14 members intact.

9. An elastic infusible product, which consists essentially of the reaction product of a compound containing more than one 1,2-epoxide group per mol and which compound is obtained by reacting a polyphenol with an epihalogenhydrin in the presence of alkali with, as cross-linking agent, a mixture of a polyalkylene glycol having an average molecular weight of about 200 to about 750 containing two terminal hydroxyl groups, which are separated from one another by a chain of at least 14 members selected from the class consisting of

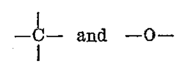

and of a dicarboxylic acid anhydride, said elastic product containing said chain of at least 14 members intact.

10. An elastic infusible product, which consists essentially of the reaction product of a compound containing more than one 1,2-epoxide group per mol and which compound is obtained by reacting dihydroxy-diphenyl-dimethyl methane with epichlorhydrin in the presence of alkali with, as cross-linking agent, a mixture of a polyalkylene glycol having an average molecular weight of about 200 to about 750 containing two terminal hydroxyl groups, which are separated from one another by a chain of at least 14 members selected from the class consisting of

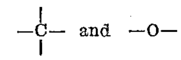

and of a dicarboxylic acid anhydride, said elastic product containing said chain of at least 14 members intact.

11. An elastic infusible product, which consists essentially of the reaction product of a compound containing more than one 1,2-epoxide group per mol and which compound is obtained by reacting an aromatic polycarboxylic acid with an epihalogenhydrin in the presence of alkali with, as cross-linking agent, a mixture of a polyalkylene glycol having an average molecular weight of about 200 to about 750 containing two terminal hydroxyl groups, which are separated from one another by a chain of at least 14 members selected from the class consisting of

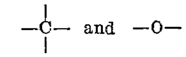

and of a dicarboxylic acid anhydride, said elastic product containing said chain of at least 14 members intact.

12. An elastic infusible product, which consists essentially of the reaction product of a compound containing more than one 1,2-epoxide group per mol with, as cross-linking agent, a mixture of a polyalkylene glycol having an average molecular weight of about 200 to about 750 containing two terminal hydroxyl groups, which are separated from one another by a chain of at least 14 members selected from the class consisting of

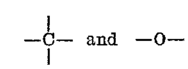

and of a hydroaromatic dicarboxylic acid anhydride, said elastic product containing said chain of at least 14 members intact.

13. A composition of matter capable of forming an elastic infusible reaction product, which consists essentially of a hardenable epoxide compound, containing more than one 1,2-epoxide group per mol and, as a cross-linking agent, a mixture of a polyalkylene glycol having an average molecular weight of about 200 to about 750 containing two terminal hydroxyl groups, which are separated from one another by a chain of at least 14 members selected from the class consisting of

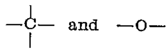

and of a dicarboxylic acid anhydride.

References Cited in the file of this patent

UNITED STATES PATENTS

| | | |
|---|---|---|
| 2,324,483 | Castan | July 20, 1943 |
| 2,720,500 | Cody | Oct. 11, 1955 |
| 2,731,444 | Greenlee | Jan. 17, 1956 |
| 2,908,660 | Belanger | Oct. 13, 1959 |

FOREIGN PATENTS

| | | |
|---|---|---|
| 629,111 | Great Britain | Sept. 13, 1949 |